United States Patent [19]

Meinig

[11] Patent Number: 5,133,580
[45] Date of Patent: Jul. 28, 1992

[54] BUTT CONNECTION BETWEEN TWO AIR DUCT SECTIONS MADE SHEET OF METAL

[75] Inventor: Manfred Meinig, Rietheim-Weilheim, Fed. Rep. of Germany

[73] Assignee: METU-SYSTEM Meinig KG, Fed. Rep. of Germany

[21] Appl. No.: 656,715

[22] Filed: Feb. 19, 1991

[30] Foreign Application Priority Data

Feb. 17, 1990 [DE] Fed. Rep. of Germany ....... 4005139
Jul. 24, 1990 [DE] Fed. Rep. of Germany ....... 4023470

[51] Int. Cl.$^5$ ........................................... F16L 23/032
[52] U.S. Cl. .................................... 285/363; 285/424
[58] Field of Search ..................... 285/363, 405, 424

[56] References Cited

U.S. PATENT DOCUMENTS

| | | | |
|---|---|---|---|
| 565,499 | 8/1896 | Pattison | 285/424 X |
| 574,743 | 1/1897 | Mallen | 285/424 X |
| 2,703,109 | 3/1955 | Saville | 285/363 X |
| 4,537,425 | 8/1985 | Press et al. | 285/363 X |
| 4,542,923 | 9/1985 | La Crosse et al. | 285/424 |
| 5,015,018 | 5/1991 | Arnoldt | 285/424 X |

FOREIGN PATENT DOCUMENTS 2630554 1/1977 Fed. Rep. of Germany .
3016860C2 11/1980 Fed. Rep. of Germany .

*Primary Examiner*—Dave W. Arola
*Attorney, Agent, or Firm*—Mason, Fenwick & Lawrence

[57] ABSTRACT

A butt connection between two air duct sections made of sheet metal has two flange frames fastened to opposed ends of two duct sections. Each flange frame is L-shaped in radial section, having an outer radially extending flange leg and an inner flange leg in a duct section, each flange frame comprising a hollow into which a leg of an L-shaped intermediate connection is fitted. Each flange frame is connected to the other flange frame, as by bolts, etc. The butt connection is equally applicable to duct sections which are of round, flattened oval, and rectangular cross sections, with the same flange frame shapes and essentially the same intermediate connector being usable.

19 Claims, 11 Drawing Sheets

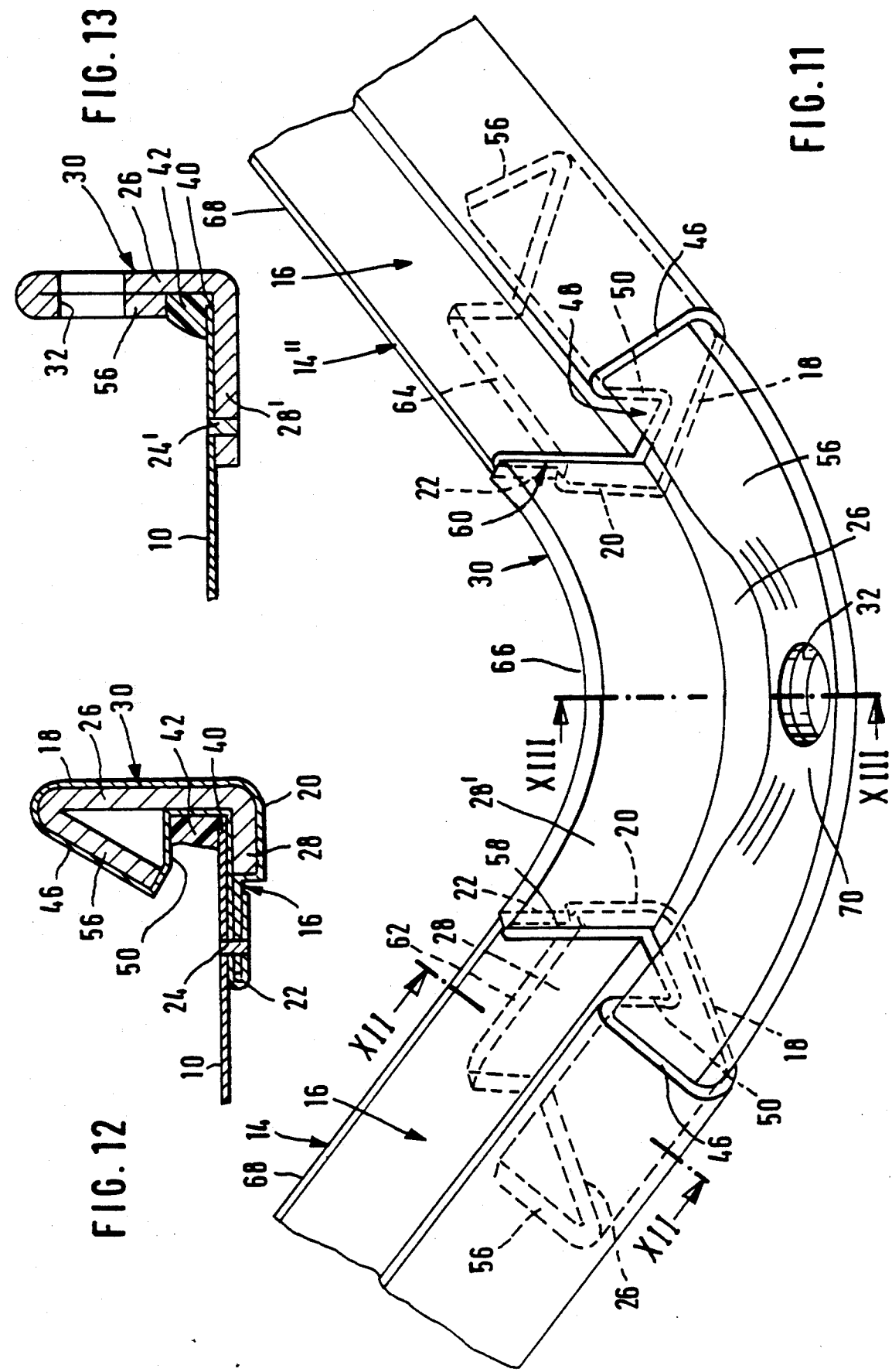

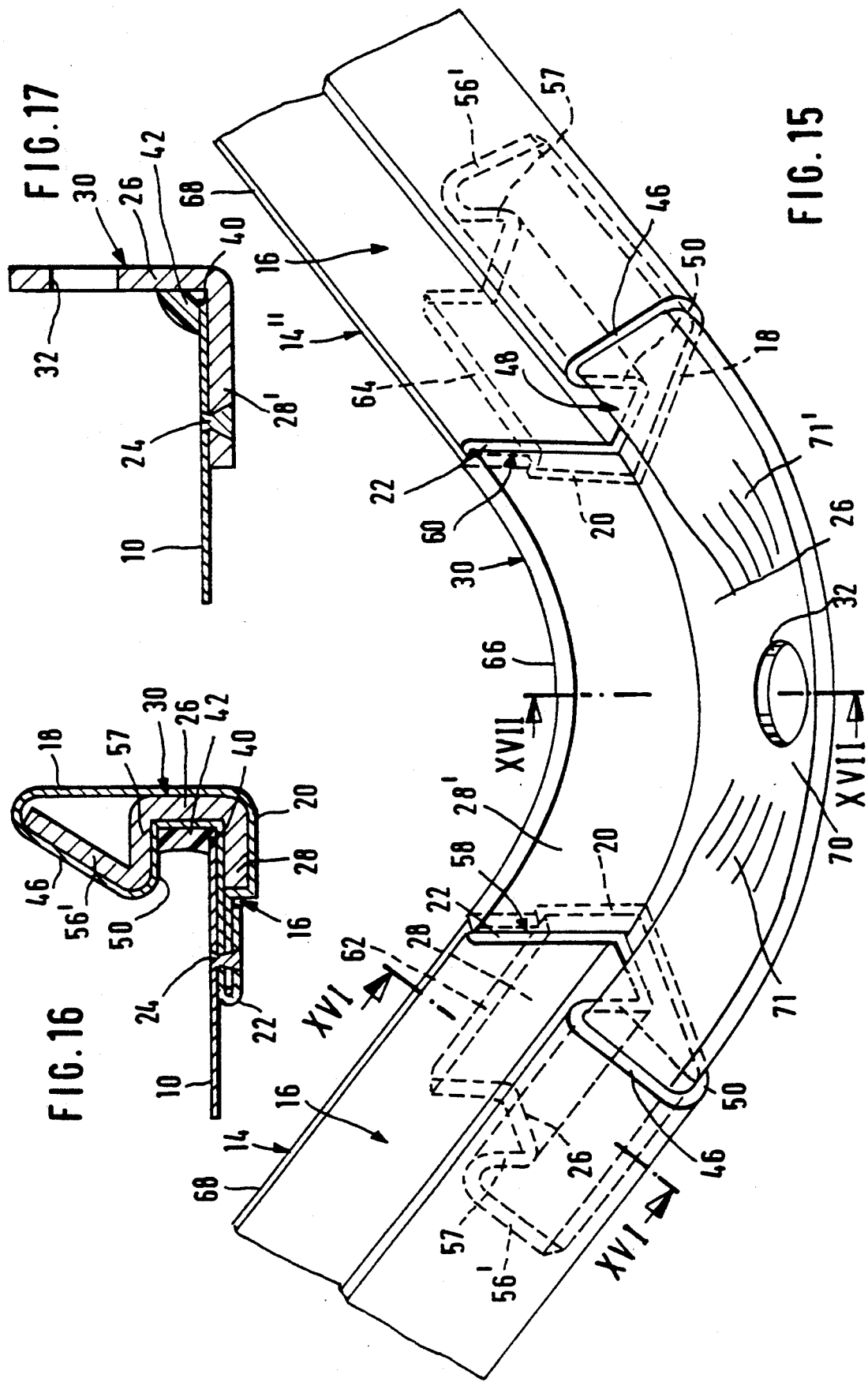

BUTT CONNECTION BETWEEN TWO AIR DUCT SECTIONS MADE SHEET OF METAL

BACKGROUND OF THE INVENTION

The invention relates to a butt connection between two round, flattened oval, or rectangular air duct sections made of sheet metal.

Numerous different forms of butt connections between individual sections of an air duct are known in air duct construction, in which different flange frames must be used to connect rectangular, round, or flattened oval air ducts, firstly to achieve inexpensive manufacture and assembly, and secondly to achieve sufficient stability and sealing. In addition, a change is under way in the presently used air duct construction, involving an increasing shift from sheet metal ducts that are creased, bent, and folded, to ducts that are wound from sheet metal strips. Starting with the familiar round, so-called wound connection tubes or spiral connection tubes, tubes with a flattened oval cross section were made by spreading these round tubes, and recently there have also been wound rectangular ducts with slightly rounded corners. The wound ducts have numerous advantages such as airtightness without special sealing measures, automatic continuous manufacture, unlimited lengths for the individual air duct sections, with a length of 6 meters being conventional, and consequently a considerable savings in flanges and assembly time. Flattened oval and rectangular cross sections are therefore used preferentially because in most buildings the room height is insufficient for larger round tubes.

On the other hand, wound connection tubes and flattened oval and rectangular ducts made from them pose problems when a flange frame is to be mounted on the end of an air duct section, because of the coiled connection spiraling around the tube. In all wound tubes and ducts, the connection is on the outside because if it were inside it would impede the air flow inside the duct. Wound tubes and ducts therefore have a smooth interior, while ducts made from sheet metal panels are smooth both inside and out. The problem is further increased by the fact that in flattened oval and rectangular wound ducts, and also in round wound connection tubes, a so-called web connection or additional ribs are increasingly being used to reinforce the duct surfaces to reduce the thickness of the sheet metal. This web connection or rib reinforcement is especially necessary in rectangular and flattened oval wound ducts, since in these cases stabilization provided by curvature is absent, which is very helpful in round tubes.

These irregular projections on the outer surfaces of wound ducts and tubes make it impossible to insert the duct wall, as in conventional rectangular ducts, into the opening of a flanged connector mounted on the end of the tube or duct to produce the butt connection. Therefore, it is only possible to use an essentially L-shaped flanged connector with one flange leg projecting essentially radially outward and one flange leg abutting the inside of the tube or duct and fastened to said inner side, and a gasket between the connector and the end of the duct. An embodiment is known for round tubes in which the inner flange leg of the connector is fastened by a spreading edge to the inside of the tube. However, in a flattened oval or rectangular duct, such a fastening of the flange frame no longer functions; instead, the frame must be fastened to the sheet metal duct by spot welding, screwing, or riveting. A seal is then produced by embedding the end of the duct wall in a bead of sealant on the flange frame. These embodiments have the disadvantage that in round tubes, gaps result between the ends of the rounded flange frame and, in flattened oval or rectangular ducts, between the individual sections of the flange frame as a result of the use of intermediate connectors, and these gaps cannot be sealed in this simple fashion. In addition, there is also the disadvantage that an L-shaped flange means cannot withstand the pull of the threaded bolts that pull the two flange frames together to form a butt connection without additional stabilizing devices. None of these known butt connections is suitable for rectangular wound ducts with rounded corners, since a "corner connector" of known design that bridges the rounded corner has a space between the individual flange frame sections which is very long and cannot be sealed, and also could not withstand the pull of the connecting threaded bolts.

In addition, it is important to consider in the case of all of the types of butt connection that have been mentioned that, in the case of the intermediate connectors between the individual flange sections, which jointly form a flange frame, the distance between them which is not sealed is further increased considerably by the fact that the flange frame and must be made several millimeters smaller than the interior of the duct, so that the inner flange leg can be inserted into the interior of the duct and the unavoidable variations in the interior dimensions of the duct can be taken into account. Therefore, when the flange frame is fastened, the intermediate connector is pulled out slightly from the flange frame so that the inner flange leg can fit tightly against the interior of the duct.

The goal of the invention is to produce a butt connection of the type recited at the outset, which is equally usable for round, oval, or rectangular air duct sections and which, despite manufacture of the air duct by the winding method and the therefore necessary connections and possibly reinforcing ribs, a continuous reliable seal of the flange frame including intermediate connectors to the ends of the channel sections is possible.

SUMMARY OF THE INVENTION

As a result of making, at least partially, each flange frame to provide an L-shaped hollow and inserting an L-shaped intermediate connector that fits snugly into this hollow, it is ensured firstly that the flange frame can essentially withstand the pull of the connecting devices, such as connecting bolts or clamping rings, without distortion and that, on the other hand, a continuous seal of the duct section end against the flange frame is possible even in the area of the inner leg of the intermediate connector that directly abuts the interior of the duct section end. It is no longer a question of having certain tolerances between the end of the duct and the flange frame including the angular or appropriately rounded intermediate connectors to produce a good continuous seal. The butt connection according to the invention is equally applicable to all types of round, flattened oval, or rectangular air ducts, which makes it considerably easier to manufacture and stock. In this type of butt connection, it makes no difference whether the intermediate connector is introduced completely into the open ends of the joined sections of the flange frame, so that the ends of the flange sections fit together, or whether a central part of the intermediate connector is exposed. In both cases, for example, a sealing bead can run continuously around the entire flange frame.

An embodiment is provided in which the central section of the intermediate connector which directly abuts the inside of the duct takes up some of the pull exerted by the connecting screws, so that the pull of the connecting screws need no longer be taken up completely by the flange frame legs, but is borne largely by the intermediate connectors themselves. This increases the stability of the entire butt connection.

Even greater stability results when the inner flange leg is extended beyond the hollow shape, thus providing a greater contact surface on the inside of the duct. In particular, the middle sections of the intermediate connector can be extended for the same purpose. Especially high stability results when these middle sections are fastened directly to the duct wall.

A sealing bead in the butt connection according to the invention can run continuously around the entire flange frame including the intermediate connectors, producing the simplest and most reliable type of seal. The butt connection according to the invention can be used equally well with intermediate connectors of all types, especially straight, curved, or angular intermediate connectors.

The additional stiffening and stabilization of the butt connection are promoted by a hollow triangular shape or body on the outer leg with an inner wall with corrugated depressions or teeth to ensure a resilient pressure of the duct against the inner leg of the intermediate connector, whereby outwardly projecting wound connections and/or ribs are supported in resilient manner by these depressions or teeth, or can be pushed through beneath the latter.

Openings that receive bolts of the butt connection can be located at any point on any flange frame, in other words, in the exposed middle sections of the intermediate connectors or in the ends of the individual flange sections, as well as the end sections of the intermediate connectors which fill the latter. The outer leg of the intermediate connector may be provided with an extension which is at an acute angle to it, for additional reinforcement, and the extension can be flattened against the outer leg in the vicinity of the openings, in order to ensure greater stiffness and resistance of the intermediate connector and/or a good seat for the bolt heads and nuts. The flattened part of the connector can be produced by pressing the extension against the outer leg or by omitting the extension in the space between the circumferentially spaced opposed ends of two circumferentially spaced flange frames.

In round air duct sections the flange frame can be mounted on the air duct section with resistance to separation by an annular rib on the inner leg resiliently urged against the inside of the round tube by pretensioning, said rib being known from German Patent 31 43 893.

BRIEF DESCRIPTION OF THE DRAWINGS

Embodiments of the invention will now be described in greater detail with reference to the drawings.

FIGS. 9 to 11, 14, 15, and 18 are partial oblique views of additional embodiments taken similar to FIG. 8, FIG. 12 is a section along line XII—XII in FIG. 11, FIG. 13 is a section along line XIII—XIII in FIG. 11, FIG. 16 is a section along line XVI—XVI in FIG. 15, FIG. 17 is a section along line XVII—XVII in FIG. 15.

DESCRIPTION OF THE PREFERRED EMBODIMENTS

Figure 1:
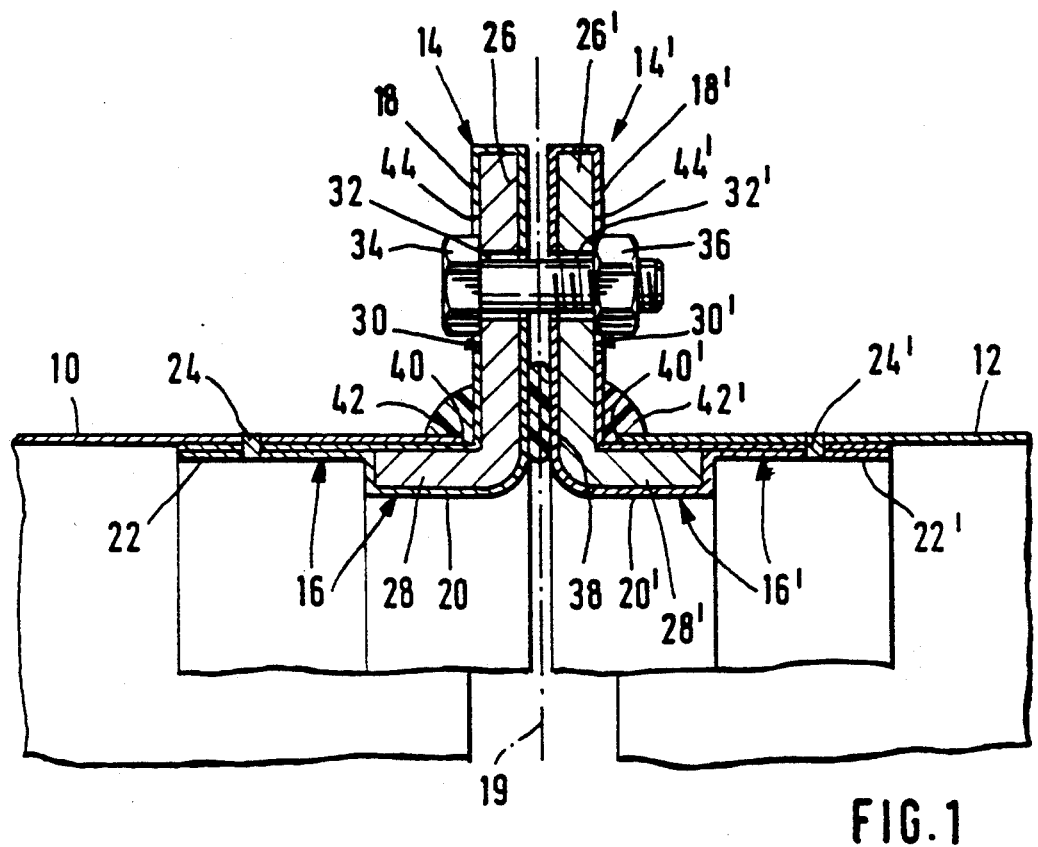
FIG. 1 is an axial partial section through a first embodiment of the butt connection according to the invention.

In the embodiment of the butt connection shown in FIG. 1, the end parts of sheet metal duct sections 10 and 12 are shown, with a flange frame, generally designated 14 and 14', being fastened to each duct section end. Each flange frame 14, 14' has an inner flange leg 16 or 16' abutting the interior of the corresponding duct section 10 or 12, and an outer flange leg 18 or 18' projecting approximately radially from duct sections 10 and 12. Outer flange legs 18, 18' are hollow throughout and extend radially outwardly, while of the inner flange legs 16, 16', only part 20 or 20', located close to the butt connection, provides a hollow. The outer flange legs 18 and 18' are in facing, adjacent relationship, and are generally parallel to plane 19 which is transverse to the axis of the duct sections 10 and 12. These hollows 20, 20' have adjacent to them and extending into the interior of duct sections 10 and 12 compressed doublewalled parts 22 or 22'. The compressed parts 22, 22' are connected permanently by spot welds 24 and 24' with the ends of each duct section 10 or 12.

The hollows parts 18, 18' and 20, 20' of flange frames 14 and 14' are filled respectively by outer legs 26, 26' and inner legs 28 and 28' of L-shaped intermediate connectors 30 and 30', in the region where the ends of two flange frames 14 and 14' come together, as described in greater detail below. The outer legs 26, 26' of intermediate connectors 30 and 30' as well as the corresponding areas of outer legs 18, 18' of flange frames 14, 14' have openings 32 and 32' through which threaded bolts 34 extend, said bolts being secured by nuts 36. Sealing strips 38 made of elastic sealing material are disposed between flange frames 14 and 14', said strips running all the way around the butt connection. Ends 40 and 40' of duct sections 10 and 12 are embedded in continuous sealing beads 42 and 42' made of elastic sealing material, said material being located in the corners of the L-shaped flange frames 14 and 14', or in the areas located between the individual flange frame sections in the corner of the intermediate connector 30, 30'.

Since the tension of connecting threaded bolts 34 in the butt connection according to the invention is taken up, not only by the flange frames 14, 14', but also and primarily by L-shaped intermediate connectors 30, 30' which fill the flange frame hollows and are much stronger than the flange frames, this type of butt connection is outstandingly suitable for every type of round, flattened oval, or rectangular sheet metal duct, as regards both stability and continuous sealing of the butt connection.

Figure 2:
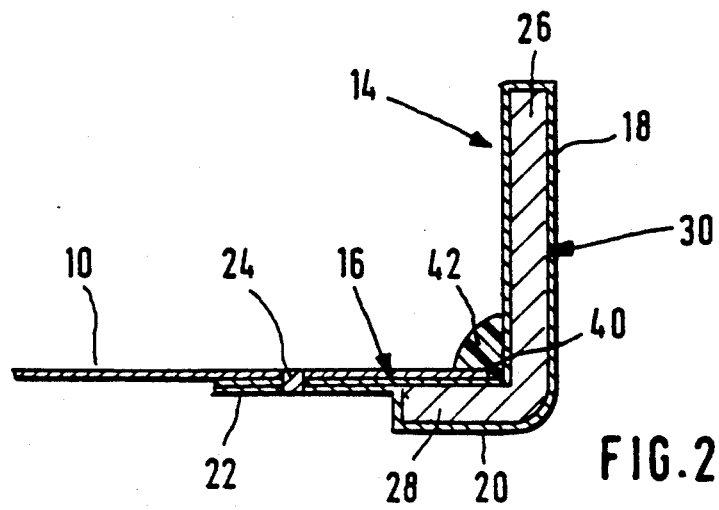
FIG. 2 is a schematically simplified axial partial section through a second embodiment, comprising only one duct end and one flange frame.

In the embodiment shown in FIG. 1, openings 44 and 44' are provided on the side of the outer legs of flange frames 14, 14' away from the contact surface, said openings somewhat simplifying the manufacture of the flange frame and only insignificantly influencing the stability of the construction because of the much greater stability of intermediate connectors 30. In embodiments with longer straight flange frame sections between the individual intermediate connectors, however, the higher stability of the continuous embodiment, without openings, shown in FIG. 2, is preferable. It should be noted that in this and all following embodiments, the same reference numbers are used for the same or corresponding parts.

Figure 3:
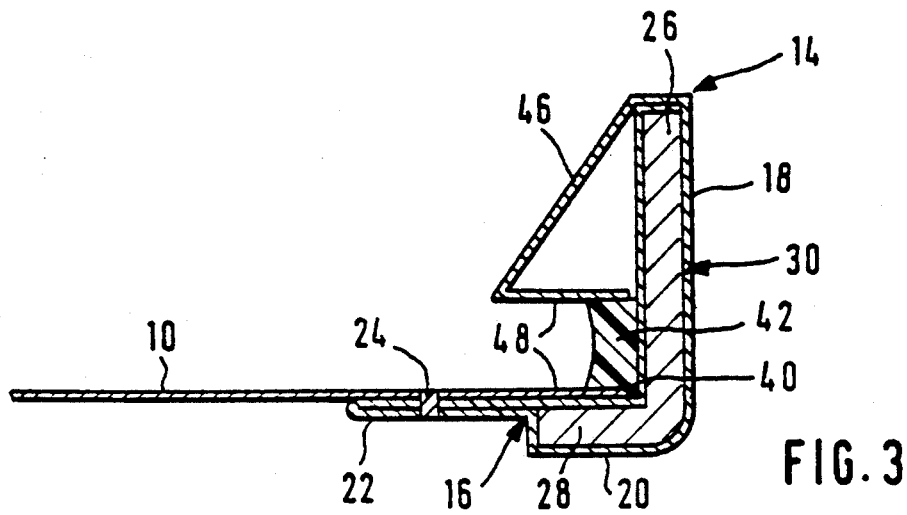
FIGS. 3 and 4 are schematic partial axial sections through further embodiments, taken similar to FIG. 2, FIGS. 5 and 6 are partial oblique views of two embodiments of a shaped wall forming part of the embodiment shown in 4.

In the embodiment shown in FIG. 3, outer flange leg 18 has in addition a triangular hollow shape or body including additional by 46 pointing away from the contact surface of duct sections 10 and 12, said shape or body forming, with duct section 10, a groove 48 to protect sealing bead 42 and to guide duct section 10. In addition, groove 48 can receive the spiral connection and spiral ribs, projecting outward from duct section 10, which are not shown.

Figure 4:
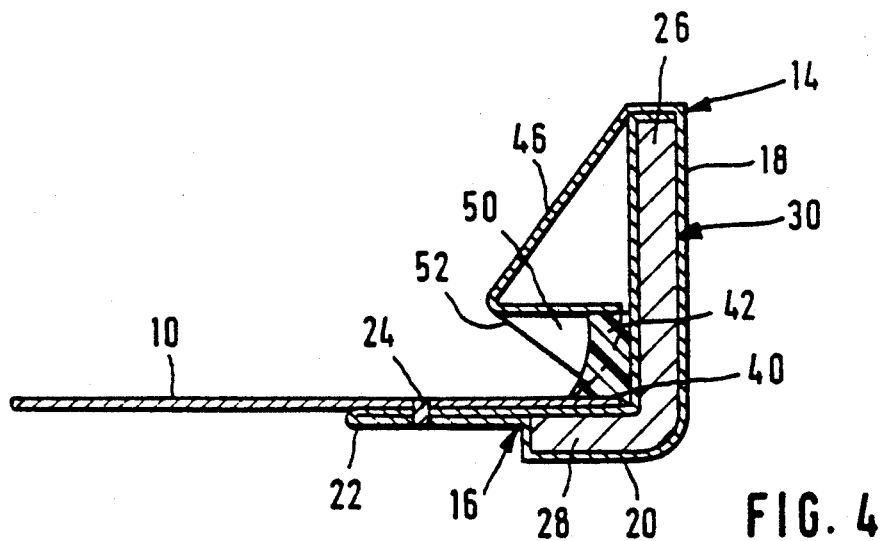
Figure 5:
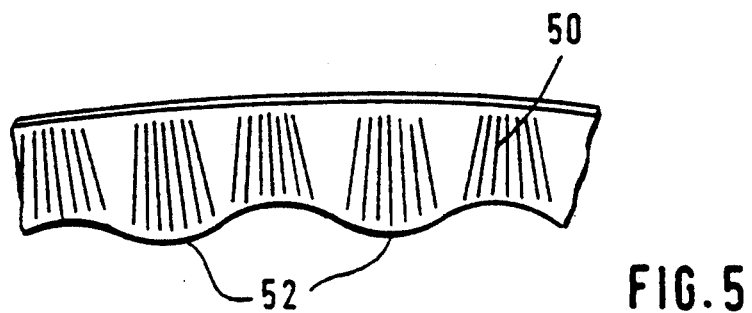

In the embodiment according to FIG. 4, inner wall 50 extends from additional leg 46 to form the triangular hollow shape or body. Additional leg 46 points toward the duct section 10, and extends diagonally inward with respect to the contact surface, and duct section 10 has corrugated depressions 52 that press duct section 10 against inner leg 28 of the intermediate connector 30. The corrugated shape of this inner wall 50 with depressions 52 is shown in greater detail in FIG. 5.

Figure 6:
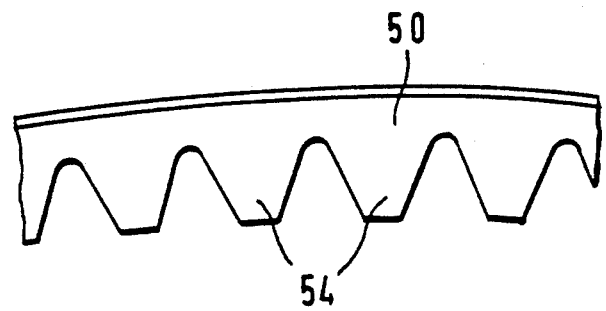

Instead of the corrugated depressions, diagonal wall 50 can also have trapezoidal or otherwise shaped teeth 54, see FIG. 6, which press duct wall 10 against inner legs 28. Both depressions 52 and teeth 54, when duct section 10 is pushed in, can elastically deflect the coiled connections or reinforcing ribs which are not shown but project outward (i.e. toward the top of the figures), or snap in behind the latter. This does not impede insertion or distortion of the duct walls or flange shape.

Figure 7:
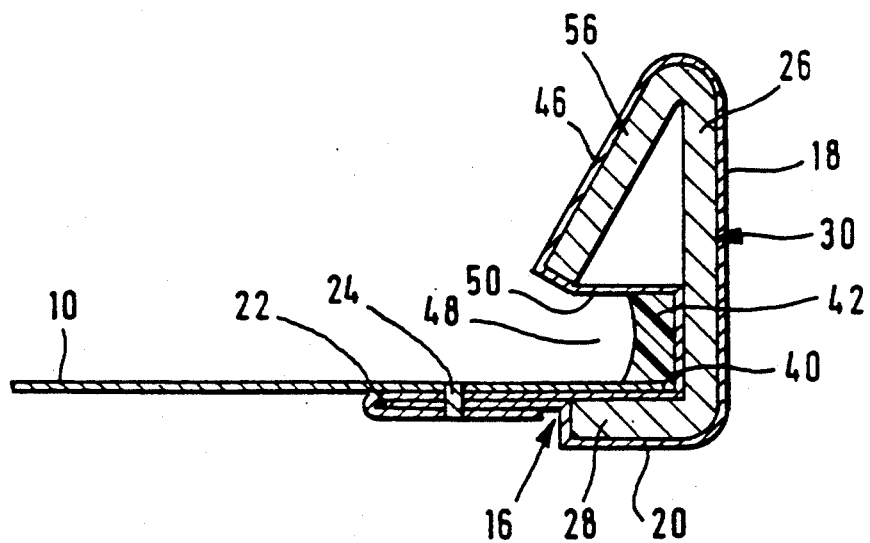
FIG. 7 is a schematic partial axial section through another embodiment taken similar to FIG. 2.

In the embodiment shown in FIG. 7 the outer flange leg 18 is combined with additional leg 46 and inner wall 50 to form a continuous hollow shape or body. Intermediate connector 30 in this embodiment has an extension 56 which is at an angle to outer leg 26, so as to fit into the triangular hollow shape or body and points diagonally inward, said extension 56 providing additional reinforcement for the butt connection.

Figure 8:
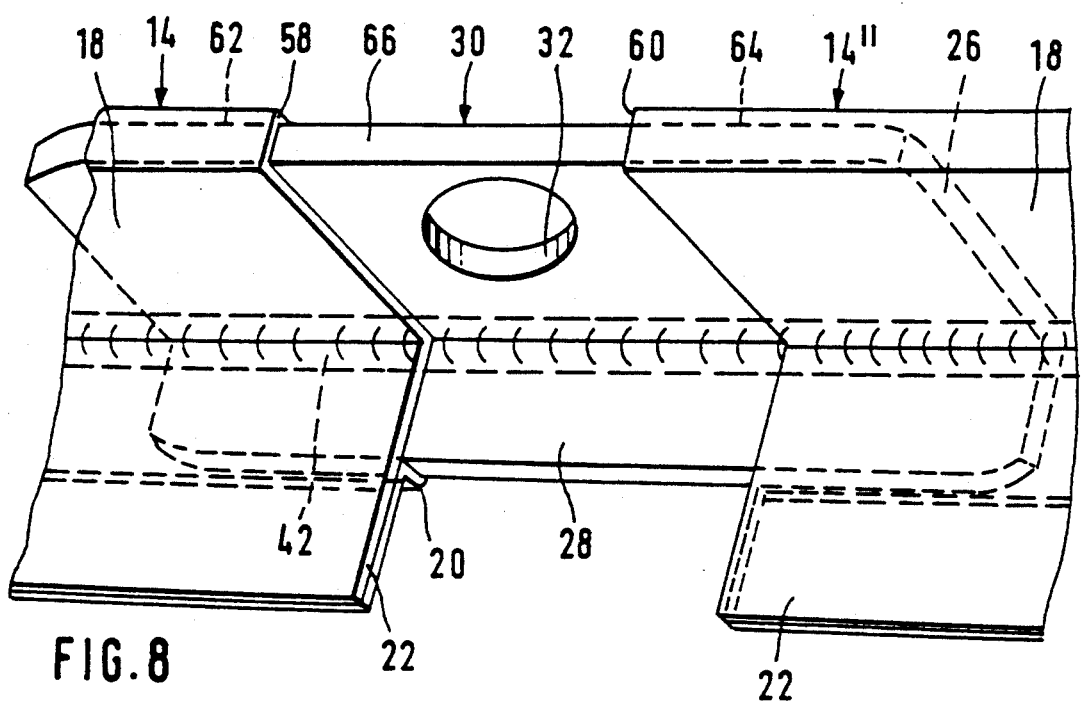
FIG. 8 is a partial oblique view of the embodiment shown in FIG. 2, with the duct wall omitted.

FIG. 8 shows the embodiment shown in FIG. 2 in the vicinity of an intermediate connector in a partial oblique view, with duct section 10 omitted. Two ends 58 and 60 of a flange frame 14 bent from one piece or of two successive flange frame sections 14 and 14" are held in place by intermediate connector 30 inserted into open shape ends 58 and 60. Intermediate connector 30 then has only its end sections 62 and 64 inserted into the hollow shapes of flange frame sections 14 and 14", while an exposed middle section 66 contains the opening 32 that receives the threaded bolt, not shown. Exposed inner leg 28 of intermediate connector 30 then abuts the interior of duct section 10, not shown, and, if greater stability is desired, can be fastened to the latter.

Sealing bead 42, as explained above, in all cases runs continuously in the area of flange frame sections 14 and 14" and middle section 66 of intermediate connector 30. Since the entire end edge of duct section 10 is embedded in this sealing bead, a type of seal is achieved which can be accomplished only at great expense in known butt connections.

Figure 9:
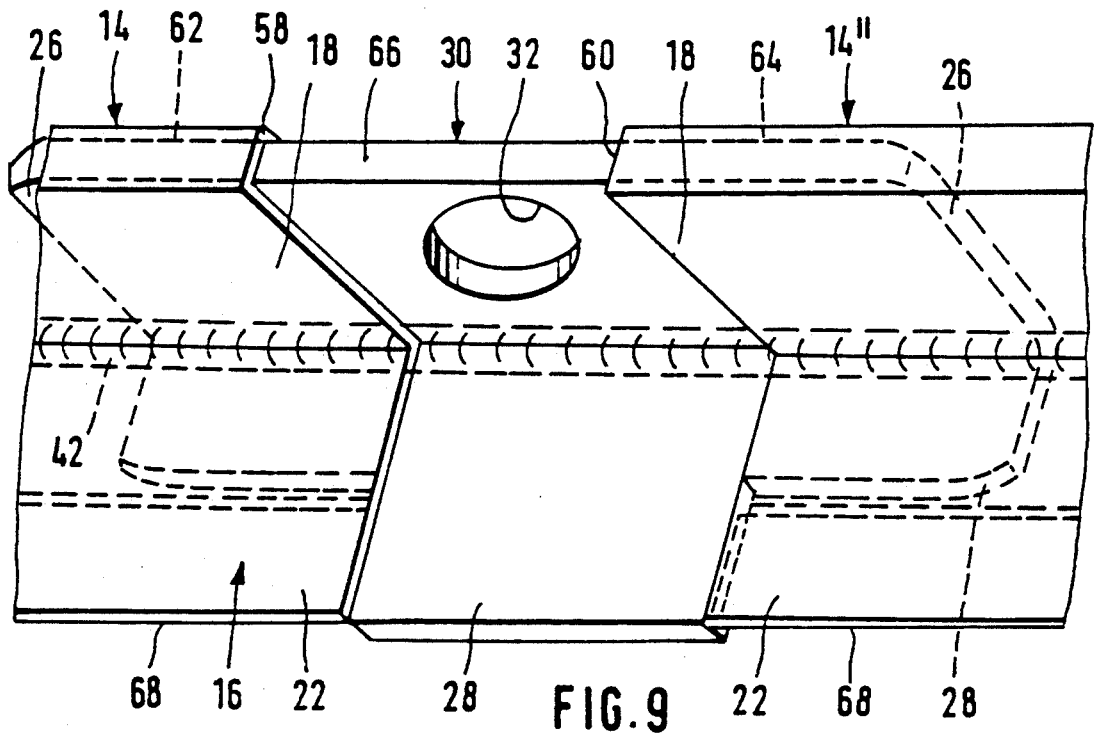

The embodiment according to FIG. 9 differs from those in FIGS. 2 and 8 in that the inner leg 28 is extended from middle section 66 of intermediate connector 30 up to the end 68 of inner leg 16 of flange frame sections 14 and 14" and is made flush with the outside of the inner flange leg, so that it abuts a relatively large area of the inner surface of duct section 10, not shown, and can be fastened to the latter if desired.

Figure 10:
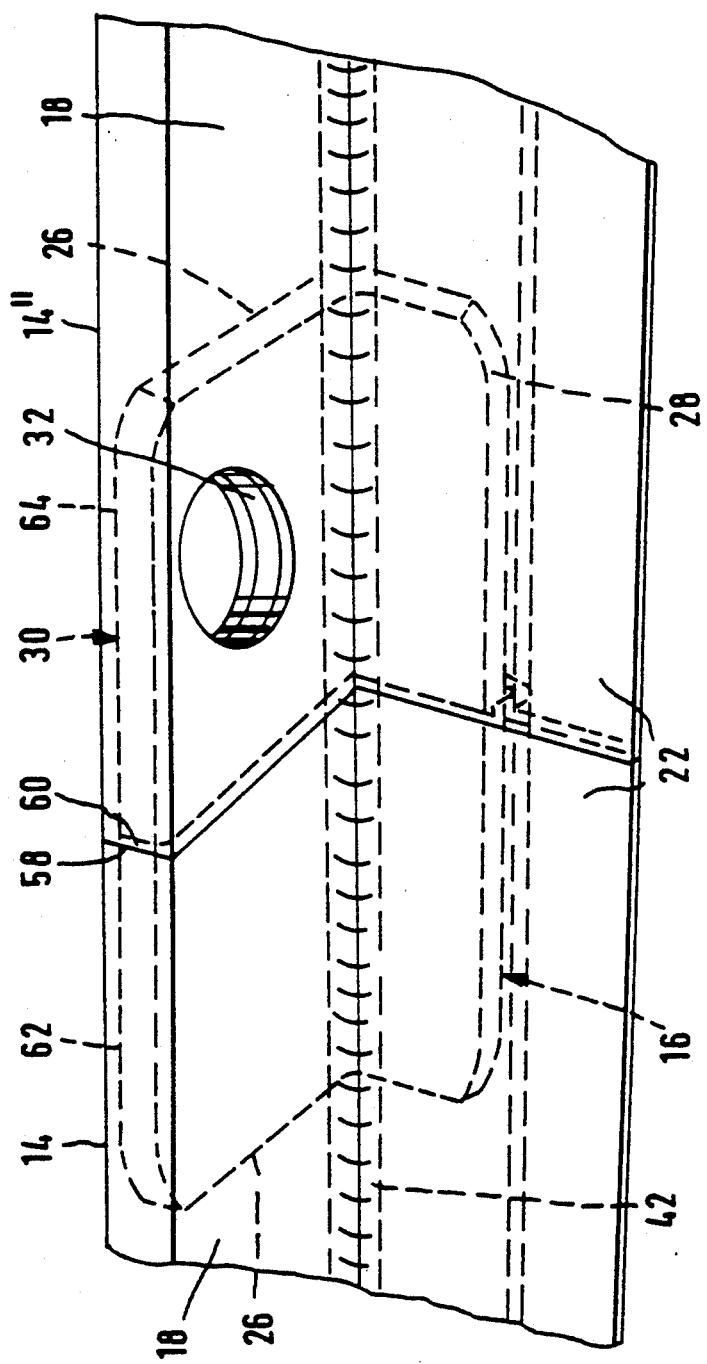

FIG. 10 shows an embodiment in which the two ends 58 and 60 of flange frame sections 14 and 14" abut one another, and intermediate connector 30 is received completely in the two hollow shapes of the flange frame. In this case, opening 32 to receive a threaded bolt, not shown, also passes through the hollow shape walls of one of flange frame sections 14".

Since straight flange frame sections are normally joined together in rectangular duct sections by intermediate connectors designed as corner angle pieces, the embodiments shown in FIGS. 8 to 10 are used primarily for round or flattened-oval ducts and flange frames.

The embodiment shown in FIGS. 11 to 13 is suitable for rectangular ducts with rounded corners, with a corner area of the kind shown in FIG. 11. The two circumferentially spaced flange frame sections 14 and 14" are connected together by an intermediate connector 30 bent at 90°, said connector having its two end sections 62 and 64 inserted into the open circumferentially spaced ends 58, 60 of flange frame sections 14 and 14", and having its exposed middle section 66 forming a rounded corner of the flange frame. As in the embodiment in FIG. 7, intermediate connector 30 in this embodiment has an extension 56 which points away from contact surface 19 (see FIG. 1), not shown in FIGS. 11 to 13, which fits into the corresponding triangular hollow body of flange frame sections 14 and 14". In addition, intermediate connector 30, as in the embodiment shown in FIG. 9, has an elongate and thickened inner leg 28' of middle section 66, which at the outside, on which duct wall 10, not shown, rests, makes a smooth transition into inner leg 16 of flange frame section 14 or 14". Continuous sealing bead 42 is also omitted in FIG. 11. Both this sealing bead 42 and duct section 10 omitted in FIG. 11, however, are shown in the sectional views in FIGS. 12 and 13.

In this embodiment, an opening 32 is provided to receive a threaded bolt, not shown, roughly in the middle of middle section 66 of intermediate connector 30, in such fashion that it passes through outer shape leg 26 of the intermediate connector 30 and extension 56. In area 70 which contains opening 32, the intermediate connector has a portion which is flattened in the manner shown in FIGS. 11 and 13, so that the portion of extension 56 abuts outer leg 26. This produces good stability in area 70 and a good seat of the threaded bolt on intermediate connector 30.

Figure 14:
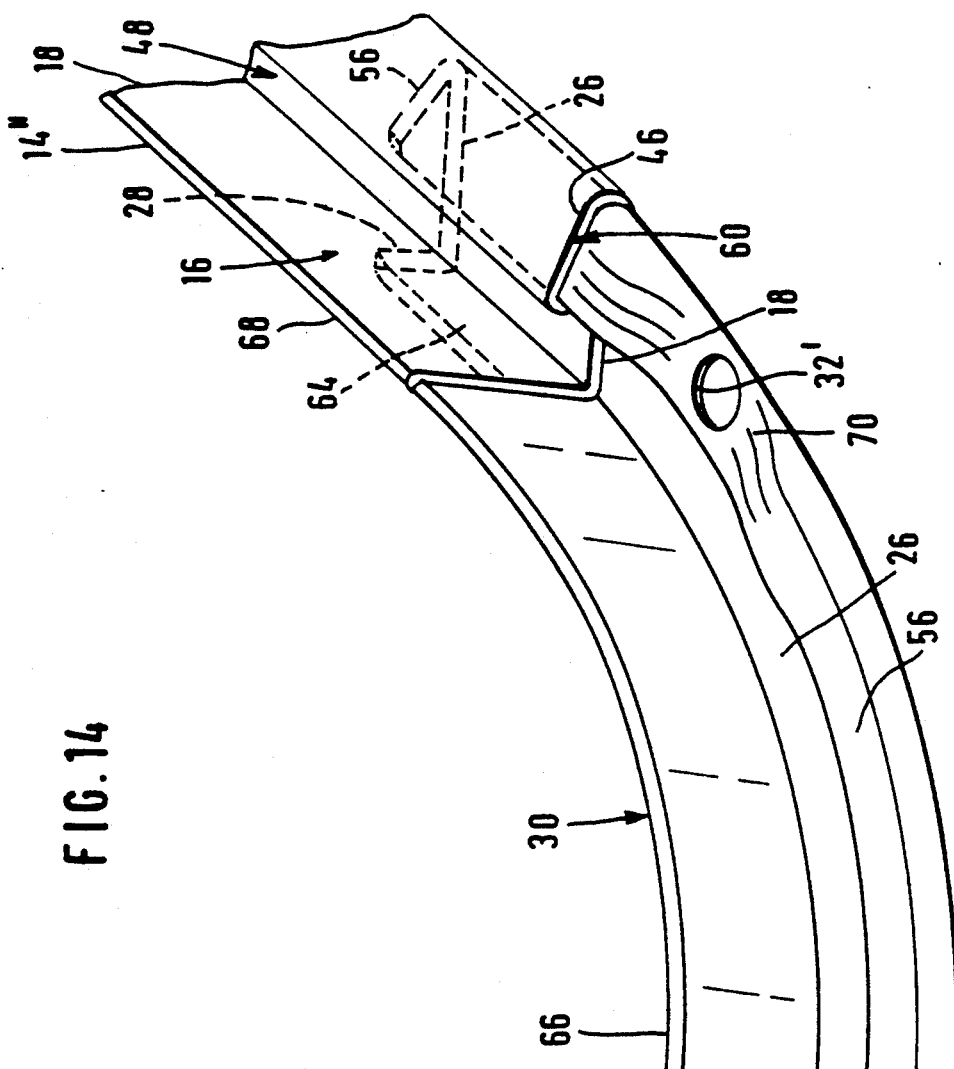

FIG. 14 shows an embodiment with a flattened oval duct cross section, whereby intermediate connector 30 in this embodiment is bent through 180° in its middle section 66 which is free of the essentially rectilinear flange frame sections 14 and 14". In this embodiment, the elongate and thickened design of inner shape leg 28' in middle section 66 is especially important since the grip produced by end sections 62 and 64 which are relatively short and project into the open shape ends of flange frame sections 14 and 14", would be too limited if duct section 10, not shown, were not additionally held at elongate inner legs 28', directly abutting the interiors of the duct section, and could be fastened thereto. In this embodiment, instead of the one opening in the embodiment shown in FIGS. 11 to 13, two openings 32 and 32' are provided near the ends of middle area 66 for threaded bolts, not shown, in flattened areas 70 and 70', respectively, in outer shape legs 26 and 56. With smaller flattened oval ducts, only one opening 32 could also be provided in the middle of middle section 66 as in the embodiment according to FIGS. 11 to 13 described above.

The embodiment according to FIGS. 15 to 17 is similar to the one shown in FIGS. 11 to 13. It differs from this previous embodiment, however, in the cross-sectional shape of intermediate connector 30, especially bent edge 56', which, in contrast to bent edge 56 shown in FIGS. 11 to 33, which points away from the contact surface, points toward contact surface 19 (see FIG. 1), which is not shown but can be thought of as being located at the bottom in FIG. 15 and at the right in FIGS. 16 and 17. In this embodiment, bent edge 56' is connected by a rib 57, running perpendicularly to the contact surface, with the remaining part of intermediate connector 30. In flattened area 70 in this embodiment, bent edge 56' and hence, of course, vertical rib 57 have been omitted, so that in this area, as shown in FIG. 17, a flat, level cross section of flange leg 26 is produced, running parallel to contact surface 19. This type of intermediate connector can be made even more simply than the embodiment shown in FIGS. 11 to 13, and is therefore preferred for many applications. From flattened area 70, there is then a transitional area 71 or 71' respectively on both sides, in which the flat flange leg cross section is bent upward so that, a short distance from open shape end 58, 60, it achieves the cross-sectional shape shown in FIG. 16, with a bent edge 56' and rib 57.

Otherwise, the embodiments shown in FIG. 15 to 17 correspond to the embodiments shown in FIGS. 11 to 13.

Figure 18:
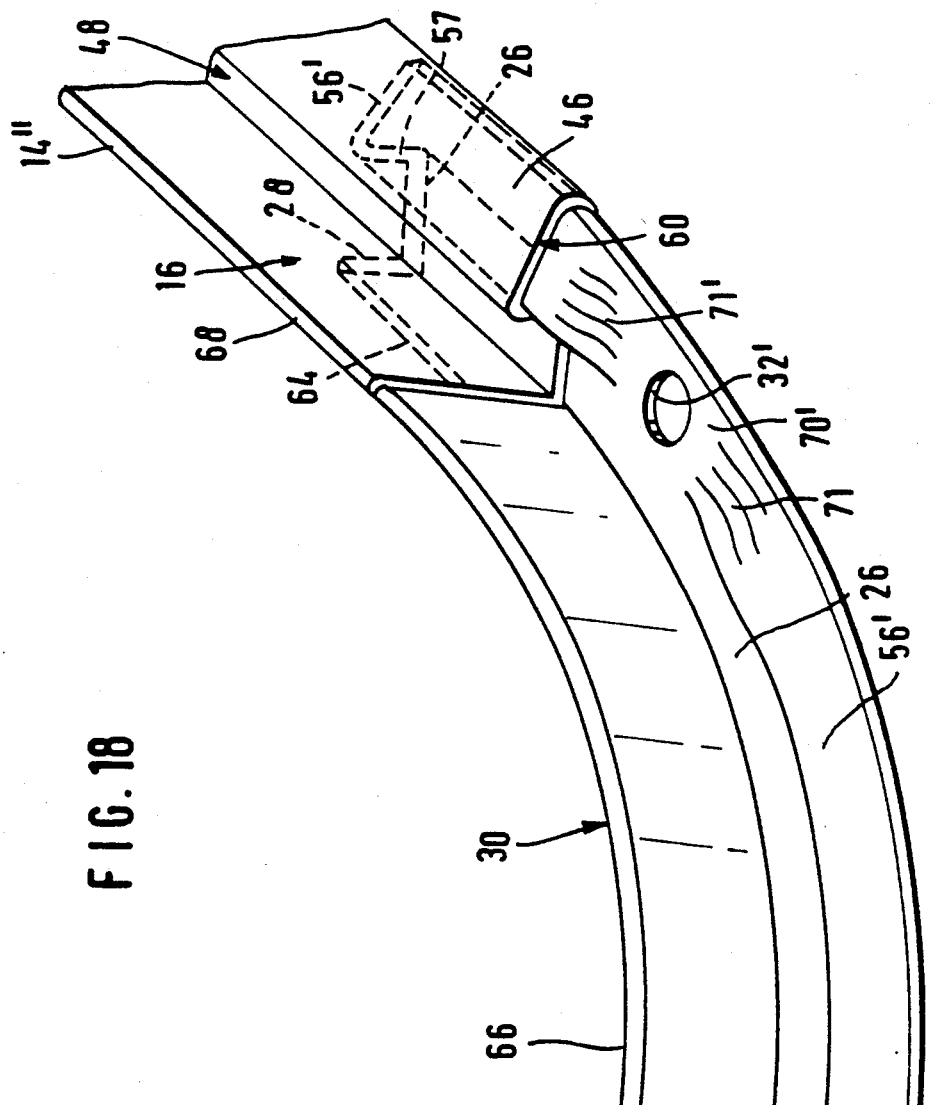

Likewise, the embodiment shown in FIG. 18 is similar to the embodiment shown in FIG. 14, but in this case flattened areas 70 and 70' do not have bent edges 56', so that in these areas the cross section of flange leg 26 is flat, as shown in FIG. 17. The rising, slowly upwardly curving transitional areas 71 and 71' in this embodiment are provided on both sides, abutting flat areas 70 and 70'. Otherwise the embodiment according to FIG. 18 corresponds to the details of the embodiment shown in FIG. 14.

Figure 19:
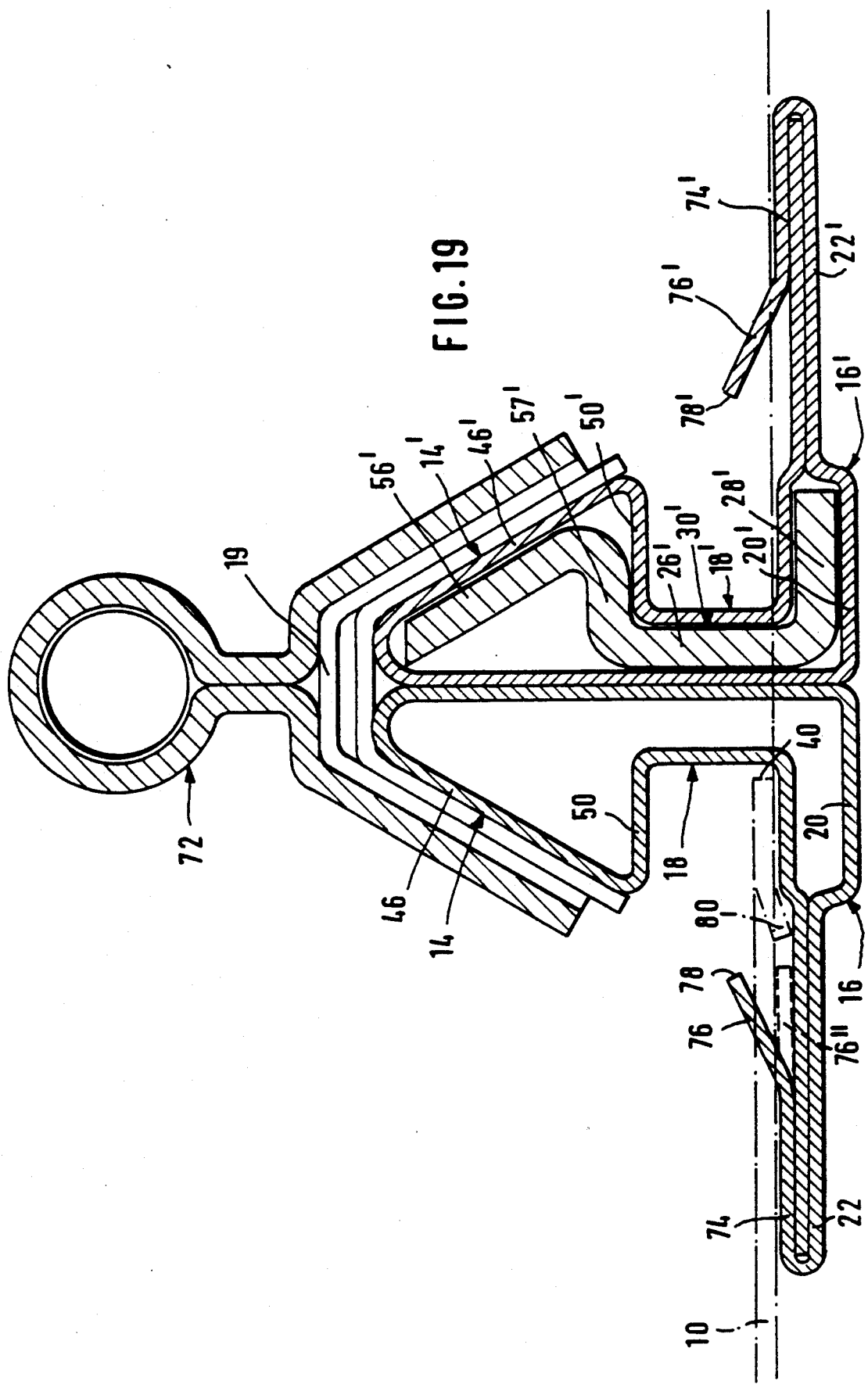
FIG. 19 is an axial partial section through an embodiment suitable for round tubes, with a pretensioned rib and a tensioning ring.

In the embodiment suitable for round tubes, shown in FIG. 19, in a manner known from German Patent 33 41 107, the two flange frames 14 and 14' are held firmly together by tensioning ring 72, mounted on their outsides and tightened, the function of said ring not requiring further description. The threaded bolts that traverse flange frame 14 and 14' are not required in this embodiment. To show the shape of flange frame 14 more clearly, the intermediate connector 30 with angled extension 56' according to the embodiment in FIG. 16 is omitted from flange frame 14, being shown only in right-hand flange frame 14'. All parts of flange frame 14' and of intermediate connector 57', in contrast to the representation in FIG. 16, have been given the corresponding reference numbers with a prime added.

In this embodiment, a sheet metal section 74, 74', abutting the interior of tubular duct section 10 (section 10' has been omitted for clarity), is provided from the ends of flat sections 22, 22' of inner flange legs 16, 16', the free edges of said sections pointing toward contact surface 19 being bent outward, away from the duct axis to form annular ribs 76, 76'. When flange ring 14 is driven into the open end of tube section 10, annular rib 76 is bent into the position 76" indicated by dashes and consequently its free edge 78 is urged against the interior of tube section 10, whereupon flange frame 14 is largely protected against being pulled out of tube section 10. At the same time, tube section 10 is forced into a desired circular shape by the pretensioning of annular rib 76. The condition prior to being driven into a tube section is shown for the right-hand flange frame 14'. By urging its free edge 78 against the inside of tube section 10, annular rib 76 itself in this embodiment performs the sealing function and it is not necessary to install a separate sealing bead.

Near end 40 of tube section 10, individual supporting projections 80 are forced inward from the wall of the tube section, behind which projections outer edge 78 of annular rib 76 is snapped, providing an additional securing measure for flange frame 14 on tube section 10. However, this embodiment assumes tube sections with neat and smooth inner surfaces in the edge area. If the inner edge area is not neat or is not flat, only embodiments with a sealing bead can be considered. However, the same tools can be used to make an embodiment with a diagonal annular rib 76 and one without a diagonal annular rib, since the diagonal annular rib is produced in any event and hence can simply be pushed in again. This pushing inward can be performed with the same tool by using a additional bending jaw or the like.

Figure 20:
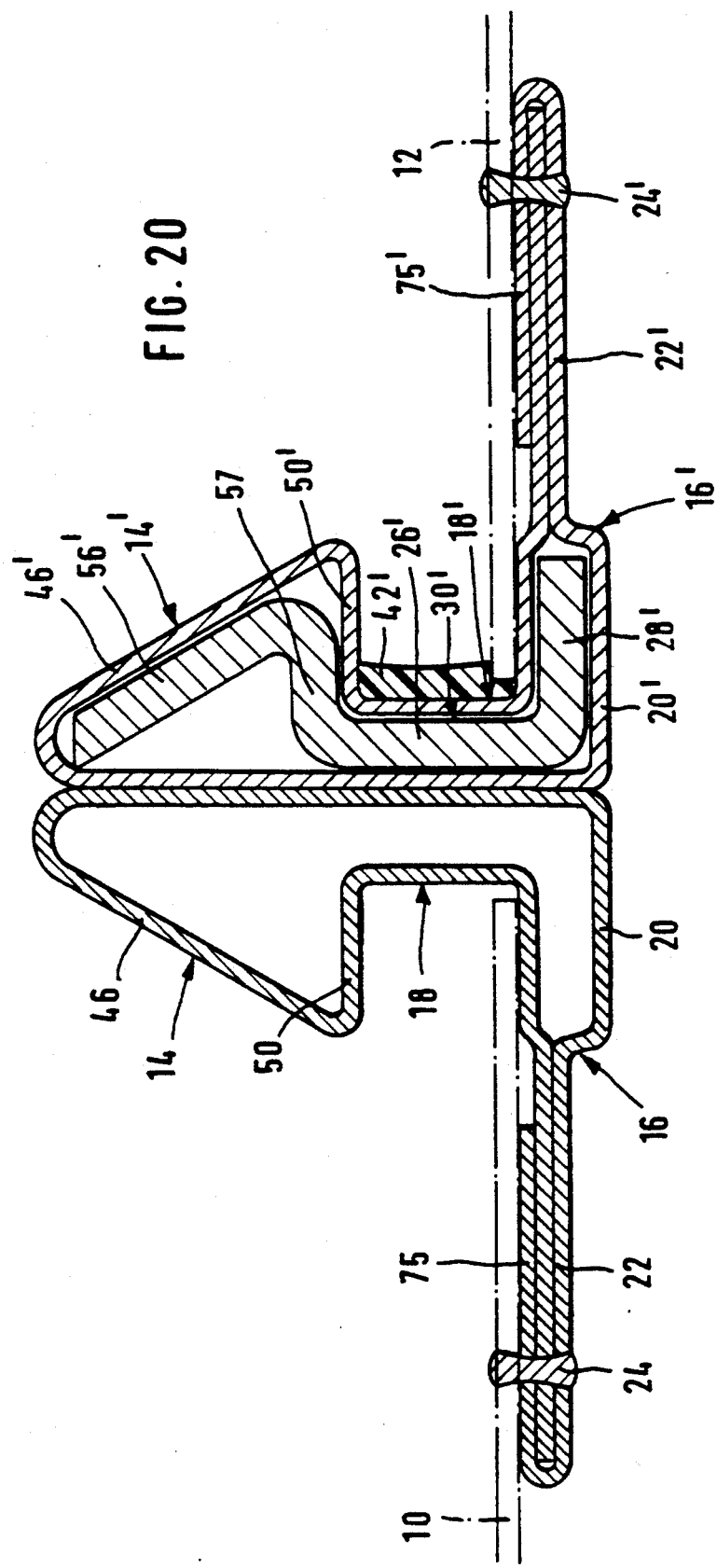
FIG. 20 is the same embodiment without a spread edge and tensioning ring.

A very similar construction is shown in FIG. 20, to be used with air duct sections 10, 12 with straight walls, with flange frames 14, 14' not being held together by a tensioning ring but, as in the embodiment according to FIG. 1, by threaded bolts "not shown in FIG. 20". In this embodiment, of course, the pretensioned annular rib 76, 76' is provided. Fastening to air duct sections 10 and 12 is provided by spot welds 24 and 24'. The three layers of sheet metal forming the inner legs 22 and 22', in connection with the other features of this embodiment, makes for an extremely stable butt connection.

What is claimed is:

1. A butt connection for connecting the ends of two duct sections made of sheet metal comprising:
   a circumferentially extending flange frame at the end of each duct section of substantially L-shape radial cross section, each flange frame having an inner flange leg within a duct section, said inner flange leg comprising means for providing a hollow inwardly of said duct section, and a circumferential and outwardly extending outer flange leg outwardly of the duct section, said outer flange leg comprising a hollow forming with said hollow providing means an L-shaped hollow, the outer flange leg of one flange frame being in opposed facing relationship to the outer flange leg of the other flange frame,
   an intermediate connector of substantially L-shape radial cross section at the end of each duct section, each intermediate connector having an outer flange leg substantially perpendicular to and outwardly of the duct section in said hollow and an inner flange leg substantially parallel to and inwardly of the duct section in said hollow defining means, means for connecting each flange frame to a duct section, and means for connecting the outer flange legs of the said flange frames to each other in said opposed facing adjacent relationship.

2. The butt connection of claim 2, wherein at least one of the flange frames has circumferentially spaced ends, the inner flange leg of the intermediate connector in the one frame substantially engaging the interior of the duct section to which the one frame is connected.

3. The butt connection of claim 2, and means for connecting the inner flange leg of the intermediate connector in a said frame to the duct section outwardly thereof.

4. The butt portion of claim 1 or 2, wherein at least a portion of the inner flange leg of at least one intermediate connector extends into the duct section approximately the same distance as the inner flange leg of the frame.

5. The butt connection of claim 1, wherein at least one flange frame has a flange leg portion extending into and adjacent the wall of the duct section, said means for connecting a flange frame to a duct section comprising a permanent connector connecting the flange frame leg portion to the adjacent duct section.

6. The butt connection of claim 1, and further comprising elastic sealing material sealing the end of each duct section and the adjacent flange frame.

7. The butt connection of claim 1, and further comprising at least one of the flange frames having on the outer leg thereof a triangular hollow body outwardly of the duct adjacent section to which said one flange frame is connected, and is remote from and pointing away from the outer flange frame.

8. The butt connection of claim 7, and further comprising a sealing band of elastic material between the triangular hollow body and the duct section inwardly thereof.

9. The butt connection of claim 7, wherein the triangular hollow body has an inner wall extending towards the adjacent duct section at a diagonal angle relative to the outer leg of the flange frame and comprises means for pressing the duct section inwardly against the inner leg of the intermediate connector.

10. The butt connection of claim 9, wherein the inner wall has corrugated depressions pressing against the duct section.

11. The butt connection of claim 9, wherein the inner wall has teeth pressing against the duct section.

12. The butt connection of claims 7, 8, or 9, and an extension on and at an angle to the outer leg of the intermediate connection, said extension being within the triangular hollow body on the outer leg of the flange frame.

13. The butt connection of claim 12, wherein the extension points toward the adjacent duct section.

14. The butt connection of claim 12, wherein the extension points away from the adjacent duct section.

15. The butt connection of claim 1, wherein at least one of the flange frames has on the outer leg thereof a triangular hollow body, outwardly of the adjacent duct section to which said one flange frame is connected and remote from the outer leg of the other flange frame, the outer leg of the intermediate connector having an extension at an angle thereto in the triangular hollow body, the flange frames having circumferentially spaced ends, and the intermediate connector having a portion thereof extending between the spaced ends of the flange frames.

16. The butt connection of claim 15, wherein between the spaced ends of the flange frames, the extension of the intermediate connection having a portion abutting the outer leg of the intermediate connector, a hole in the outer leg, and the abutting portion of the extension of the intermediate connector, the means for connecting the outer leg of said flange frames including a bolt extending through said holes.

17. The butt connection of claim 15, the extension of the intermediate connector extending only in the spaced ends of the flange frames.

18. The butt connection of claim 1, wherein the inner leg of the flange frame has a rib with a free end urged toward and engaging the interior of the duct section.

19. The butt connection of claim 18, wherein the duct section has a portion thereof extending inwardly with a free edge directed away from the outer leg of the flange frame and positioned to engage the free end of the rib to prevent separation of the duct section from the flange frame.

* * * * *